ALEXANDER R. MAXEY
INVENTOR.
BY Fleher & Swain
ATTORNEYS

ALEXANDER R. MAXEY
INVENTOR.
BY Flehr & Swain
ATTORNEYS

Dec. 1, 1964 A. R. MAXEY 3,159,501

MAGNETIC TAPE APPARATUS

Filed June 24, 1959 7 Sheets-Sheet 3

ALEXANDER R. MAXEY
INVENTOR.

BY
ATTORNEYS

ALEXANDER R. MAXEY
INVENTOR.

BY Flehr and Swain
ATTORNEYS

MAGNETIC TAPE APPARATUS

Filed June 24, 1959 7 Sheets-Sheet 5

ALEXANDER R. MAXEY
INVENTOR.

BY Flehr and Swain
ATTORNEYS

Dec. 1, 1964 A. R. MAXEY 3,159,501

MAGNETIC TAPE APPARATUS

Filed June 24, 1959 7 Sheets-Sheet 6

ALEXANDER R. MAXEY
INVENTOR.

BY Flehr and Swain
ATTORNEYS

Dec. 1, 1964 A. R. MAXEY 3,159,501

MAGNETIC TAPE APPARATUS

Filed June 24, 1959 7 Sheets-Sheet 7

ALEXANDER R. MAXEY
INVENTOR.

BY Flehr & Swain
ATTORNEYS

United States Patent Office 3,159,501
Patented Dec. 1, 1964

3,159,501
MAGNETIC TAPE APPARATUS
Alexander Rainey Maxey, San Mateo, Calif., assignor to Ampex Corporation, Redwood City, Calif., a corporation of California
Filed June 24, 1959, Ser. No. 822,628
4 Claims. (Cl. 179—100.2)

This invention relates generally to apparatus making use of a record tape for wide band signal recording and/or playback operations.

Presently available commercial apparatus of the above character (see Patent 2,866,012) employs a rotary head assembly comprising a plurality of transducer units which are carried by a wheel or drum-like head. The tape is advanced perpendicular to the plane of rotation of the head, and is engaged by guide means whereby it is cupped for contact with the transducer units. For playback operation electronic switching means serves successively to connect the transducing units to a common signal circuit in which the original composite signal is reproduced. Equipment of this type which has been manufactured for television recording and reproduction, makes use of four transducer units which sweep across the tape along tracks that are substantially at right angles to the length of the tape. While such apparatus gives satisfactory operation for video or television recording, it is characterized by relatively complicated electronic circuitry. Another type of broad band recorder employs guide means which engages one helicoidal turn of the tape, and a single rotary transducer unit which sweeps across the tape at an acute angle to the length of the tape. One difficulty with such equipment is that a substantial length of coiled tape is being swept by the transducer unit, whereby the fidelity of recording and/or reproduction is susceptible to distortions due to variations in tape stretch.

It is an object of the present invention to provide apparatus which presents many of the advantages of the above described helicoidal wrap machine, while avoiding serious distortion due to variations in tape stretch.

Another object of the invention is to provide a machine of the above character which is relatively compact with respect to the tape guiding means employed, and which employs simple tape threading operations.

Another object of the invention is to provide apparatus of the above character having novel means for effecting accurate adjustment of the guide means.

These and other objects of the invention will become more clearly apparent from the following description when taken in connection with the accompanying drawing.

Referring to the drawing.

Figure 1:
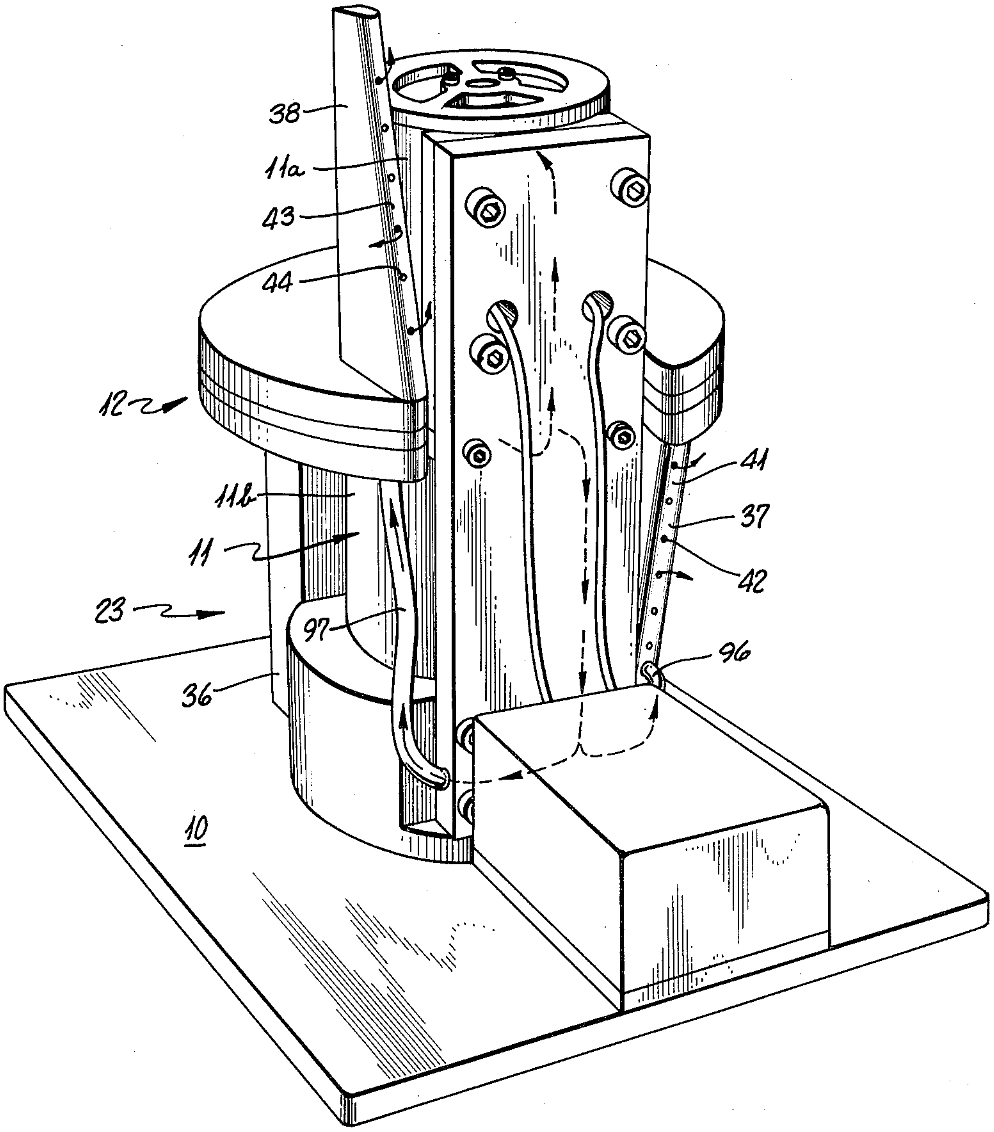
FIGURE 1 is a perspective view showing a tape guiding and rotary head assembly.
Figure 2:
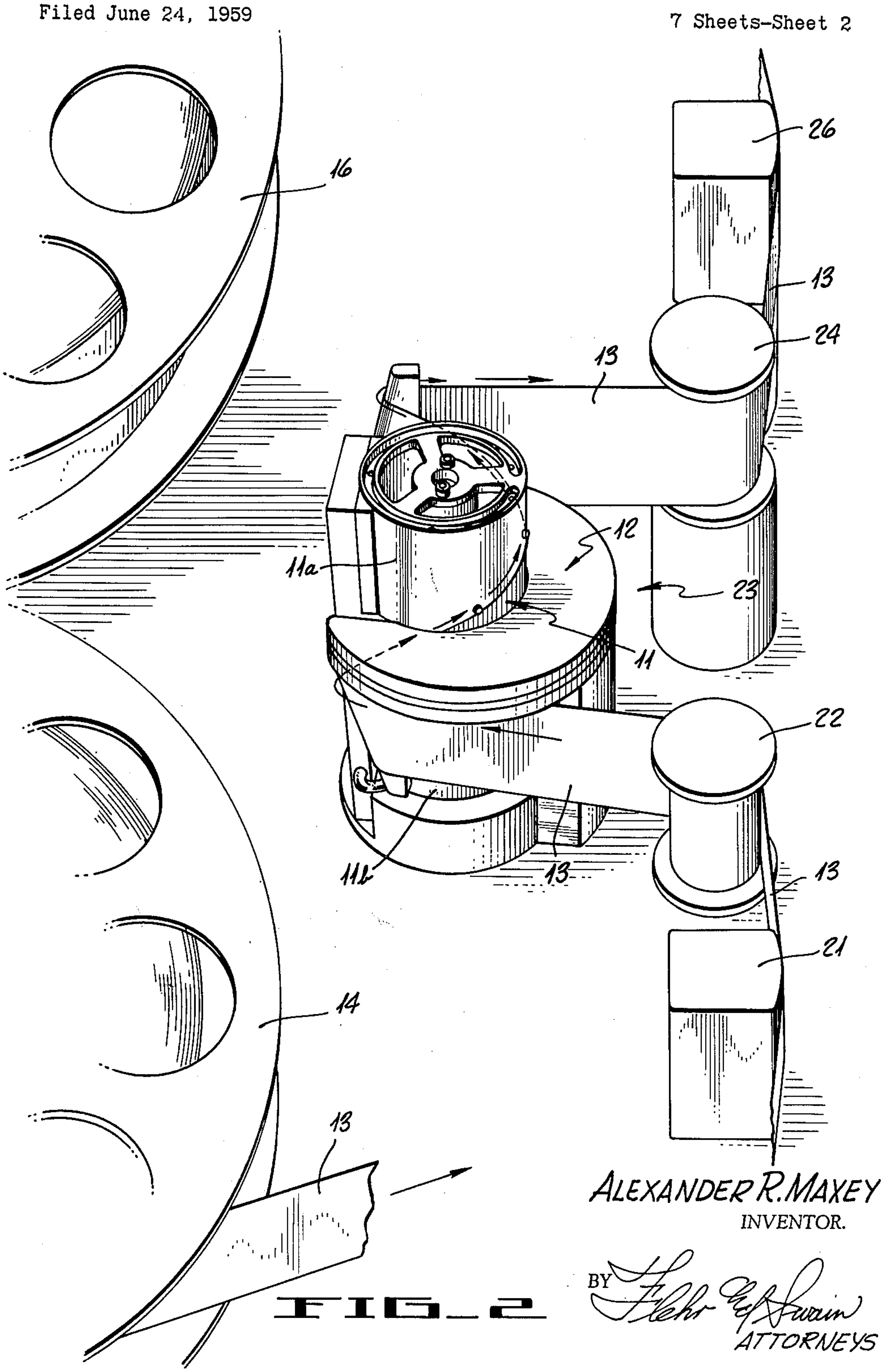
FIGURE 2 is a perspective view of a magnetic tape apparatus in accordance with the invention.
Figure 3:
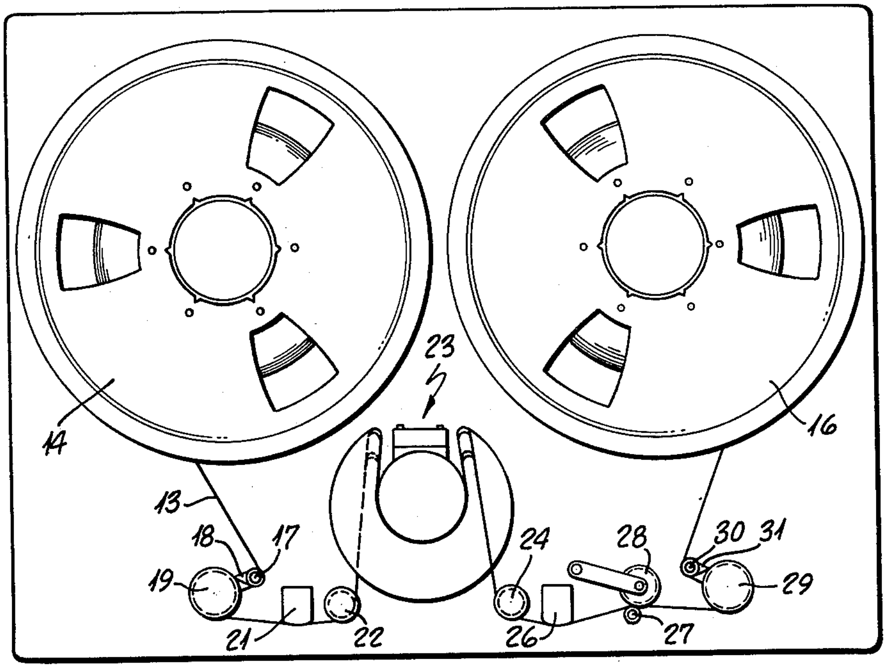
FIGURE 3 is a plan view of magnetic tape apparatus in accordance with the invention.

The apparatus illustrated in FIGURES 1–3 of the drawing consists generally of a base 10, which may be the mounting panel of the machine, and which carries the internal and external guide means designated generally 11 and 12. As shown in FIGURE 2, the record tape 13, which may be of the pliable magnetic type, is carried by the supply and take-up reels 14 and 16, that are carried by suitable motor driven turntables. The tape leaving the reel 14 is shown engaged over a roller 17 that is carried by the spring pressed tape tensioning arm 18, and from thence passes over the guide roller 19, across the stationary magnetic head 21 and over the roller 22 to the assembly 23, which includes the aforesaid guide means 11 and 12. From the assembly 23, the tape is shown passing over the guide roller 24, across the stationary head 26, and into engagement with the driving capstan 27. A clamping roller 28 is energized by a solenoid or like means (not shown) to clamp the tape against the driving capstan. From the driving capstan the tape is shown extending about the guide roller 29, and over the roller 30 on the spring pressed tension arm 31, to the take up reel 16. As will be presently explained, the heads 21 and 26 may be employed to operate upon margins of the tape, and may, for example, record a sound track and a control frequency for controlling the driving speed of the tape during playback.

The internal guide means 11 of the assembly 23, as illustrated in FIGURES 1–3, is formed by two aligned and axially spaced cylindrical sections **11*a*, 11*b*, which taken together, define a section of a cylindrical surface. The external tape guide means 12 is a substantially U-shaped structure which generally embraces the gap between the cylindrical sections 11*a*, 11*b*. In the embodiment illustrated in FIGURES 1–3, the external guide means is rigidly affixed to the base 10, as by means of supporting standards 36. However, as will be presently explained, in the embodiment illustrated in FIGURES 5–11, the external guide means is adjustably mounted. Tape guiding members 37 and 38 are mounted below and above the tape guiding means 12, and are engaged by the tape as it is advanced to the assembly 23 and as it leaves the assembly. Member 37 provides a rounded tape engaging face 41 which is inclined to the axis of the cylindrical sections 11*a* and 11*b*. The rounded surface is interrupted by a plurality of small holes or ducts 42 which form ducts connected to a source of pneumatic pressure. As will be presently explained, during normal operation air is supplied continuously through the ducts 42, thus causing pneumatic floating action of the tape to minimize friction. Member 38 similarly has a rounded tape engaging surface 43, which is interrupted by the ducts or openings 44**.

As shown particularly in FIGURES 5–8, the outer guide structure, designated **12*a* in this instance, is mounted to permit precise adjustments relative to the inner guide sections 11*a* and 11*b*. Thus, in this instance, one extremity of the U-shaped structure 12*a* is carried by stud 46 (FIGURE 8) which in turn is mounted eccentrically upon the upper end of the shaft 47. This shaft is journalled within a fixed mountnig member 48, which in turn is affixed to the base 10. Shaft 47 can be adjusted angularly by suitable means, such as a gear 50 mounted upon the shaft, and engaged by a worm 51 that is carried by the adjusting shaft 52. The end portion 53 of the shaft 52 projects in the manner illustrated in FIGURE 5, whereby it is available for engagement with a screw driver or like tool. The other extremity of the guide member 12***a* is shown provided with a shoulder 54 (FIGURE 5) which is urged against the eccentric 55 by the tension spring 56. The eccentric 55 is carried upon the upper end of a shaft 57, which is journalled within the stationary mounting member 58, and which likewise can be turned angularly by turning a projecting shaft member 59. Suitable indicating means can be provided to indicate the angular position of both shafts 47 and 57. Such indicating means can consist of the pointers 61 and 62 operating along the calibrated sectors 63 and 64 upon the upper ends of the mounting members 48 and 58.

It will be evident from the foregoing that when the member 59 is turned, the eccentric 54 rotates angularly to move the adjacent extremity of the guide member 12*a* about the axis of the eccentric stud 46. By adjusting the setting of both shaft portions 53 and 59, the guide structure 12*a* can be precisely adjusted with respect to the cylindrical sections 11*a* and 11*b*, thereby to provide a desired uniform clearance between the inner surface of the guide structure and the outer peripheral surface of the cylindrical sections 11*a* and 11*b*.

Figure 9:
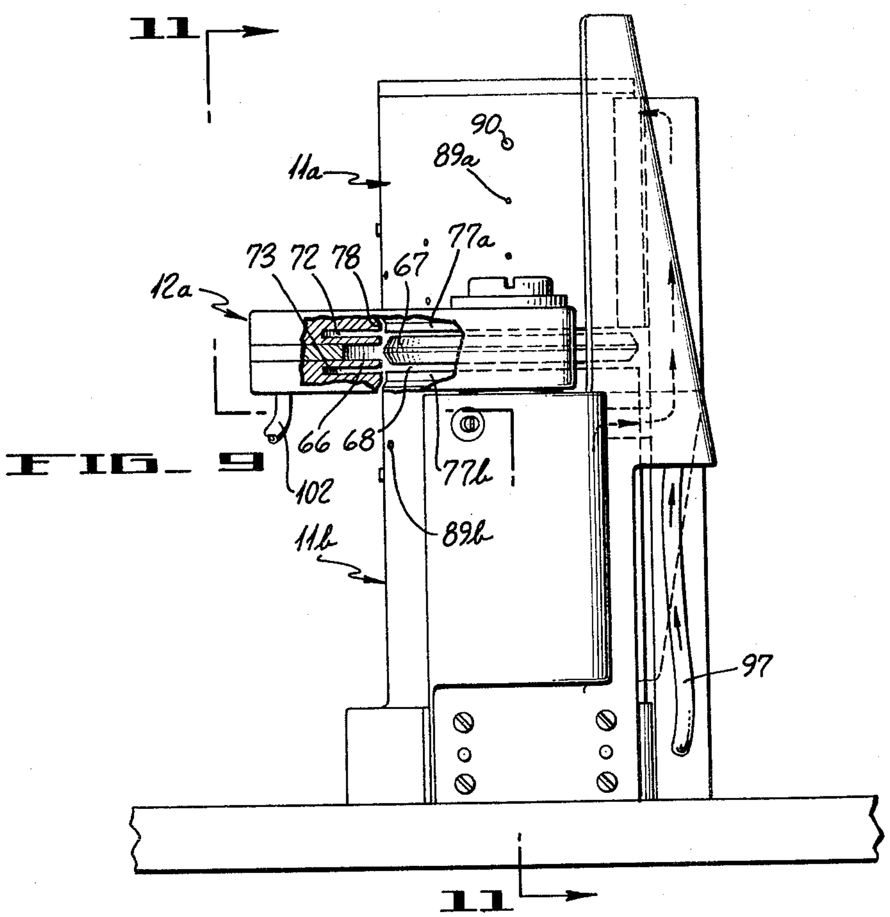
FIGURE 9 is a side elevational view of the guiding and rotary head assembly taken along the line 9—9 of FIGURE 7.
Figure 10:
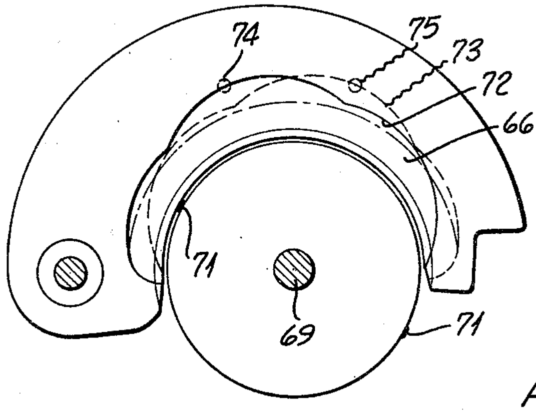
FIGURE 10 is a sectional view taken along the line 10—10 of FIGURE 7.

Whether the outer guide structure is fixed as in FIGURES 1–3, or adjustable as in FIGURES 5–8, it is formed with recesses in the manner illustrated in FIGURE 9. The inner peripheral surface of the guide structure 12*a* in this instance is interrupted by the arcuate recess 66. A wheel-like rotary head assembly 67 is shown disposed within the axial gap 68, between the cylindrical sections 11*a* and 11*b*. This assembly is carried by a motor driven shaft 69. It is provided with diametrically opposed transducer units which have tape engaging tips 71 projecting slightly from the periphery of the head. The arcuate recess 66 in the structure 12*a* generally embraces the region of operation of the transducer tips. Additional arcuate recesses 72 and 73 are provided along side the centrally located recess 66, and the side recesses are in communication with the pneumatic suction ducts 74 and 75 (FIGURE 10).

The adjacent end portions of the cylindrical sections 11*a* and 11*b*, near the axial gap 68, may be of reduced diameter as indicated at 77*a* and 77*b*. The inner peripheral surface 78 of the guide structure 12*a*, conforms to the section of a cylinder, the effective diameter of which is slightly greater than the effective external diameter of the cylindrical sections 11*a* and 11*b*.

Figures 11, 12, 13:
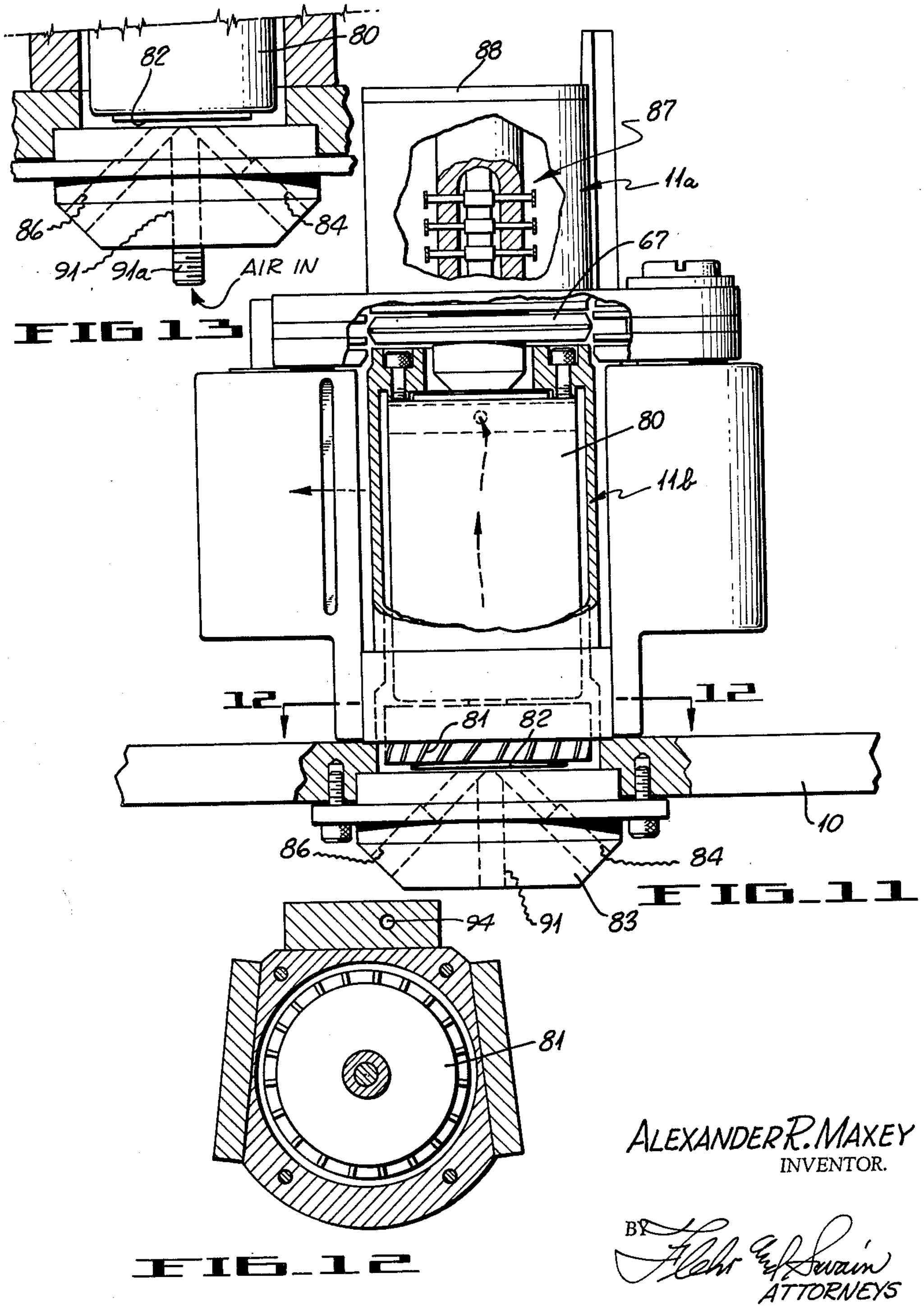
FIGURE 11 is a view partly in section taken along the line 11—11 of FIGURE 9.
FIGURE 12 is a sectional view taken along the line 12—12 of FIGURE 11.
FIGURE 13 shows a partial elevational view of the lower portion of the apparatus showing an alternative embodiment.

FIGURE 11 shows a suitable driving motor 80 housed within the cylindrical section 11*b*, and having its shaft directly connected to the rotary head 67. A blower wheel 81 is shown attached to the lower end of the motor shaft, and the end face 82 of this wheel can be made to form a pulse generator, corresponding to the pulse generator disclosed in said U.S. Patent 2,866,012. Thus, a mounting closure 83 is shown carried by the base 10 below the motor, and is provided with openings 84 and 86 suitable for mounting a light source and a photoelectric cell respectively.

The upper guide section 11*a* can be used to house the commutator assembly 87 by means of which the leads from the two transducer units can be connected to the two inputs of the signal circuitry. The upper end of the commutator assembly can be carried by the spider 88 which is mounted upon the cylindrical section 11*a*.

During operation it is desirable to float the tape upon the exterior peripheries of the cylindrical sections 11*a* and 11*b* by the use of pneumatic pressure. Thus, a plurality of ducts 89*a* and 89*b* open through the outer peripheries of the cylindrical sections 11*a* and 11*b*, and during normal operation are supplied with air under pressure. The tape is retained against side-wise movement by causing one tape edge to engage the stationary abutment studs 90.

The motor blower wheel 81 can be relied upon to supply sufficient air under pressure for properly floating the tape upon the guiding surfaces. Thus, this blower wheel draws air through the duct 91 and delivers air under pressure through the duct 92 (FIGURE 12) which leads to a manifold duct 93. Alternatively, air may be supplied under pressure to the duct 91*a* and the blower assembly dispensed with (FIGURE 13). From this duct air flows through the duct 94 (FIGURE 7) to the tubes 96 and 97 for delivering air to the holes 42 and 44 of the guide members 37 and 38. The holes 89*a* and 89*b* in the cylindrical sections 11*a* and 11*b* likewise communicate with the pressure side of the blower wheel. Holes 89*a* may communicate through ducts 98 (FIGURE 5) in member 11*a*, with a manifold duct 99 in the annulus 88*a* of the spider 88. The manifold duct connects with duct 93 by way of duct 101. Suitable ducts (not shown) likewise connect the holes 89*b* with duct 93. Suction ducts 74 and 75 are shown connected to an independent source of pneumatic suction through tube connections 102 equipped with suitable control valves.

Figure 4:
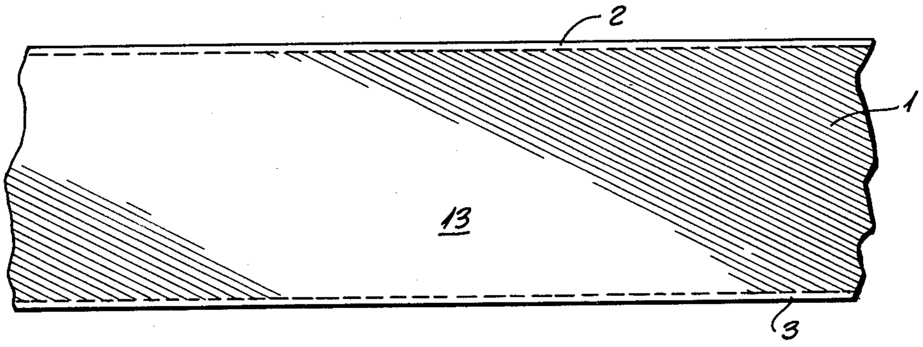
FIGURE 4 shows a magnetic tape with parallel record tracks which extend obliquely across the tape.
Figure 5:
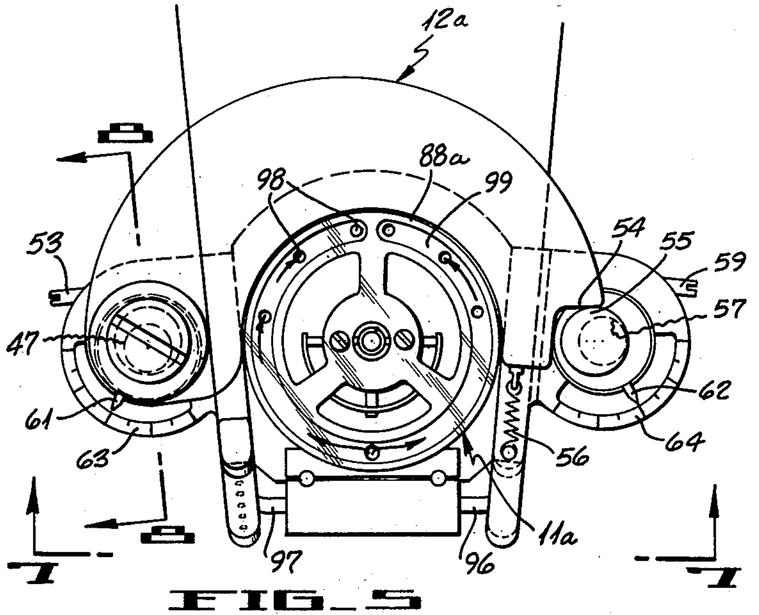
FIGURE 5 is a plan view showing a tape guiding and rotary head assembly including adjustable external guide means.
Figure 6:
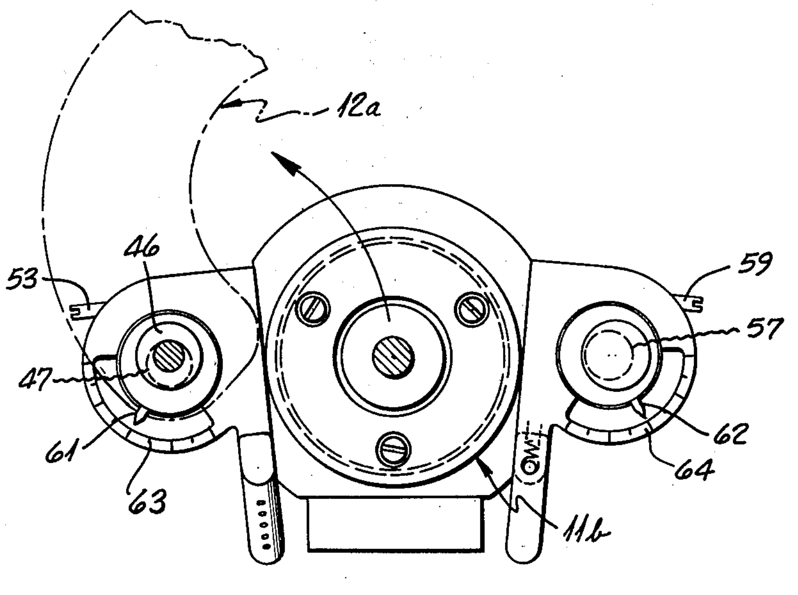
FIGURE 6 is a plan view similar to that of FIGURE 5 showing the external guide means open.
Figure 7:
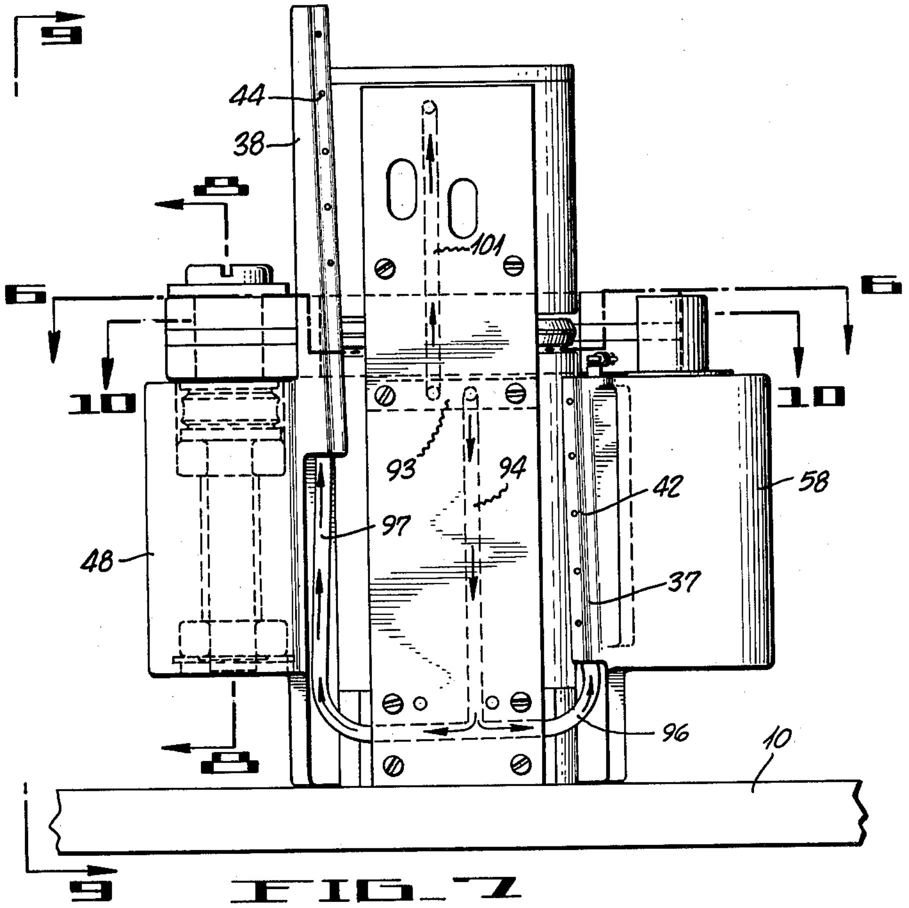
FIGURE 7 is an elevational view of the guiding and rotary head assembly taken along line 7—7 of FIGURE 5.
Figure 8:
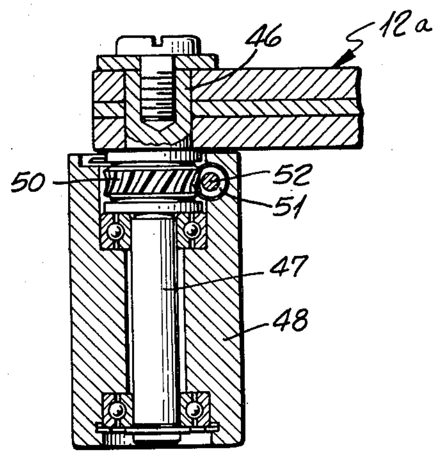
FIGURE 8 is a sectional view taken along the lines 8—8 of FIGURES 5 and 7.

Operation of the apparatus described above can be described as follows: The tape is inserted in the manner illustrated in FIGURE 2, with portions of the tape engaging the inclined guide members 37 and 38, and a loop of the tape between these guide members positioned between the cylindrical guide sections 11*a* and 11*b*, and the U-shaped structure 12*a*. When the motor 81 is placed in operation, pneumatic pressure supplied to the various guide surfaces causes the tape in effect to float upon thin films of air. Application of suction to the arcuate recesses 72 and 73 causes the outer smooth peripheral surface of the tape to be urged into contact with the inner peripheral surface 78. Assuming now that the tape is engaged with the driving capstan by the clamping roller 28, the tape is driven at a constant rate with a portion of the tape being presented for contact with the tips 71 of the transducer units. The successive sweep tracks 1 of the transducer units as shown in FIGURE 4 are parallel and extend obliquely across the tape. Edge margins 2 and 3 of the tape can be used for recording sound and for a motor control frequency. That portion of the tape which is being swept by the transducer units is bent to conform to a cylindrical section substantially 180° in extent. Assuming that the sweep contact is over slightly more than 180°, marginal edges of the tape can be used for purposes as indicated above, leaving the sweep tracks of sufficient length whereby a continuous signal can be reproduced upon playback.

As disclosed in said Patent 2,866,012 switching means of the electronic type can be used in the signal circuitry for automatically switching from one transducer unit to the other, whereby end portions of the sweep track which carry overlapping or duplicate information, are omitted, and the major portions of the tracks reproduced and combined to form a continuous composite signal. Patent 2,866,012 together with British Patent 798,927 of 1955, likewise discloses how the driving motor for the rotary head and the motor for the capstan can be controlled by use of a recorded control frequency to insure accurate tracking upon playback.

Because of the relatively short length of the tape being contacted by the transducer tips, variations in tape stretch do not produce serious distortions in the reproduced composite signal. Use of two transducer units in place of four or more greatly simplifies the signal circuitry.

I claim:

1. In apparatus of the type using a record tape for recording or play-back operations, the combination comprising: a base member; guide means mounted on said base member and defining a tape guiding surface conforming substantially to a section of a cylinder, said surface being interrupted by a generally circumferentially oriented axial gap; rotary transducer means including at least two diametrically opposed transducer heads operating in said gap; a pair of supply and take-up reels mounted on said base member in spaced parallel planes and with the rotational axes of said reels generally parallel to the axis of said cylinder section; a pair of guide posts mounted on said base member at opposite sides of said guide means and on opposite sides of said gap, with said guide posts being inclined at opposite angles to the axis of said cylinder; and means for guiding said tape from said supply reel to a first one of said guide posts in a path following the plane of said supply reel and reversely around said first guide post, thence in a helicoidal half-turn around said cylindrical guide means and across said gap to the second of said guide posts, and thence reversely around said second guide post and to said take-up reel in a path following the plane of said take-up reel.

2. In apparatus of the type using a record tape for recording or playback operations, the combination comprising two aligned cylindrically-shaped sections spaced axially to provide an annular gap between adjacent ends of the same, the external peripheries of said cylindrical sections conforming to the surface of a cylinder and forming a tape guiding surface, rotary transducer means operating in said annular gap, external guide means for directing the record tape into guiding relationship with said guide surface with the tape following a helicoidal path on said surface and across said gap, said external guide means serving to present the tape to the guide surface and to withdraw the tape from the guide surface in regions spaced substantially 180° apart, that portion of the tape extending between said regions being swept by the transducer means along successive tracks extending obliquely across the tape, said external guide means including a concave member generally embracing said annular gap and terminating in a pair of guide post portions axially spaced and disposed at opposite angles with respect to the axis of said cylindrical sections, and means for advancing and withdrawing said tape from said guide post portions in planes generally perpendicular to said axis, whereby said tape is adapted to be supplied and to be taken up by means of reels disposed in said planes but is guided along said helicoidal path in the vicinity of said gap.

3. In apparatus of the type using a record tape for recording or playback operations, the combination comprising a base member, stationary guide means mounted on said base member and defining a tape guiding surface conforming substantially to a section of a cylinder, which cylindrical section projects outwardly from said base member with its axis generally perpendicular to said base member, said surface being interrupted by a generally circumferentially oriented axial gap, rotary transducer means including at least two diametrically opposed transducer heads operating in said gap, a pair of supply and takeup reels mounted on said base member in spaced parallel planes and with the rotational axes of said reels generally parallel to the axis of said cylindrical section, a pair of tape guide members projecting outwardly with respect to said base member at opposite sides of said guide means and on opposite sides of said gap, said tape guide members having rounded tape engaging faces which are inclined at opposite angles to the axis of said cylindrical section, and means for guiding said tape from said supply reel to the first of said tape guide members in a path following the plane of said supply reel and around the tape engaging face of said first tape guide member, thence in a helicoidal half turn around said guide means and obliquely across said gap to the second of said guide members, and thence around the tape engaging face of said second tape guide member and to said takeup reel in a path following the plane of said takeup reel.

4. In apparatus of the type using a record tape for recording or playback operations, the combination comprising a base member, stationary guide means mounted on said base member and defining a tape guiding surface conforming substantially to a section of a cylinder, which cylindrical section projects outwardly from said base member with its axis being generally perpendicular thereto, said cylindrical surface being interrupted by a generally circumferentially oriented axial gap, rotary transducer means including a pair of diametrically opposed transducer heads operating in said gap, a pair of tape guide members projecting outwardly with respect to said base member on opposite sides of said guide means and on opposite sides of said gap, whereby a tape is threadable about said guide members and said guide means by moving the same edgewise with respect to said base member, means for feeding tape to the first of said guide members and means for receiving tape from the second of said guide members, said guide members having rounded tape engaging faces which are inclined at opposite angles to the axis of said cylindrical section so that tape received by said first guide member passes around the tape engaging face of said first guide member, thence in a helicoidal half turn around said cylindrical tape guiding surface and obliquely across said gap to said second guide member, and thence around the tape engaging face of said second guide member.

References Cited in the file of this patent

UNITED STATES PATENTS

| | | |
|---|---|---|
| 2,773,120 | Masterson | Dec. 4, 1956 |
| 2,919,314 | Holt | Dec. 29, 1959 |
| 2,968,702 | Fay | Jan. 17, 1961 |
| 3,042,756 | Buslik | July 3, 1962 |

FOREIGN PATENTS

| | | |
|---|---|---|
| 1,188,391 | France | Sept. 22, 1959 |

OTHER REFERENCES

Article, Electronics, August 1, 1957, title, Video Tape Recorder (pp. 138–144).